No. 884,187.  
PATENTED APR. 7, 1908.  
A. A. MINORSKY.  
HOSE COUPLING.  
APPLICATION FILED JUNE 11, 1907.
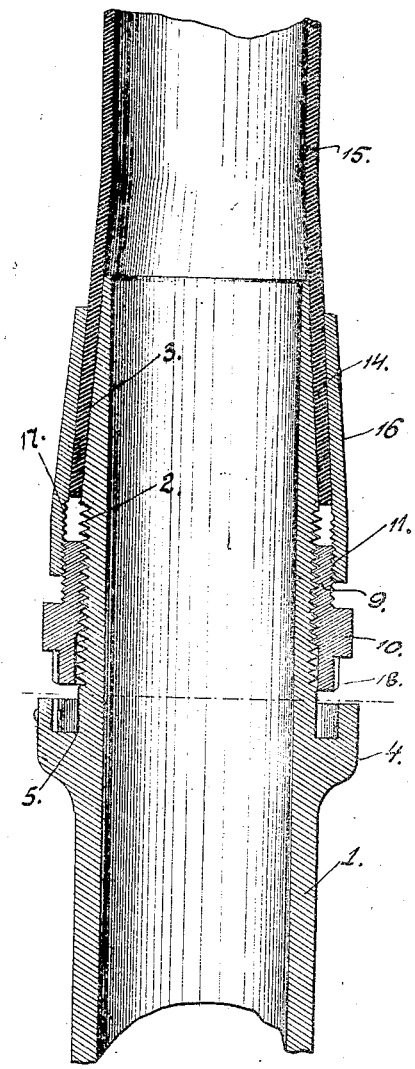
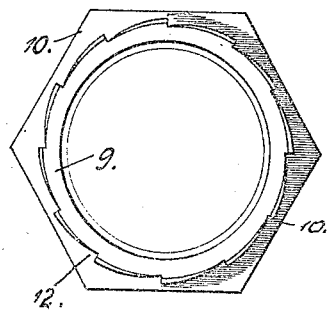
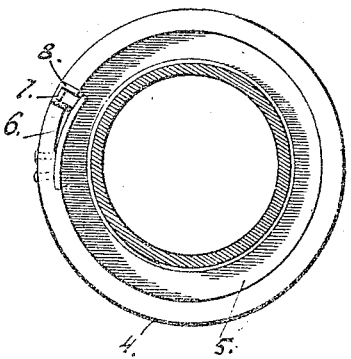
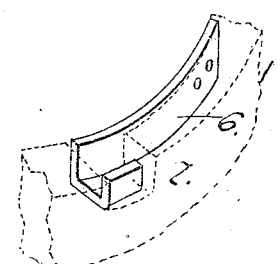
WITNESSES:  
A. H. Rabsag,  
L. H. Butler
INVENTOR  
A. A. Minorsky,  
BY H. C. Evert & Co.  
Attorneys

UNITED STATES PATENT OFFICE.

ALEXIS ALEXANDER MINORSKY, OF WILKINSBURG, PENNSYLVANIA.

HOSE-COUPLING.

No. 884,187.

Specification of Letters Patent.

Patented April 7, 1908.

Application filed June 11, 1907. Serial No. 378,413.

*To all whom it may concern:*

Be it known that I, ALEXIS ALEXANDER MINORSKY, a subject of the Czar of Russia, residing at Wilkinsburg, in the county of Allegheny and State of Pennsylvania, have invented certain new and useful Improvements in Hose-Couplings, of which the following is a specification, reference being had therein to the accompanying drawing.

This invention relates to improvements in hose couplings, and the invention has for its object the provision of positive and reliable means for retaining the end of a hose upon a pipe, whether the same be carried by a fire plug, hydrant or fire engine, etc.

Another object of my invention is to provide a novel lock for preventing the hose coupling from being accidentally disconnected, as might occur if the hose were twisted and moved.

With the above and other objects in view, which will more readily appear as the invention is better understood, the same consists in the novel construction, combination and arrangement of parts to be presently described and then specifically pointed out in the appended claims.

Referring to the drawing, Figure 1 is a sectional view of a hose coupling. Fig. 2 is an elevation of a collar forming part of the coupling. Fig. 3 is a cross sectional view of a pipe constituting one of the members of the coupling, and Fig. 4 is a perspective view of a locking arm used in connection with the coupling.

In the accompanying drawings 1 designates the pipe member of the hose coupling, the pipe member being provided with right handed exterior screw threads 2 and with a tapering end 3. Adjacent to the threads, I provide the pipe member with a peripheral flange 4, forming an annular socket 5. In the socket 5 is secured a resilient arm 6, and adjacent to the free end of said arm I provide an extension 7, protruding into an opening 8 formed in the flange 4.

Threaded upon the member 1 is a collar 9 having a hexagon shaped enlargement 10, to accommodate a wrench (not shown) employed for rotating the collar upon the pipe member 1. The collar at one side of the enlargement 10 is provided with left handed screw threads 11, while the opposite side is provided with ratchet teeth 12. The flared end 14 of a section of hose 15 is adapted to fit over the tapering end 3 of a pipe member 1. Fitting upon the tapering end 14 of the hose is a sleeve 16 having interior left handed screw threads 17 adapted to screw upon the threads 11 of the collar 9. After the hose has been placed upon the tapering end of the pipe member, the sleeve 16 is rotated upon the collar to bind the hose upon the pipe member. The collar 10 is now rotated, which draws inwardly upon the sleeve 16, further clamping the hose upon the pipe member.

In order that the ratchet end of the collar 9 can enter the socket 5, I have slightly beveled the ratchet teeth 12, as at 18, whereby the resilient arm 6 will be elevated and permit the ratchet end of the collar to seat in the socket 5. The resilient arm 6 is adapted to hold the collar 9 in a fixed position, until it is desired to disconnect the coupling, at which time the resilient arm is removed from engagement with the ratchet end of the collar. This is accomplished by inserting the finger in the opening 8 of the flange 4 and moving the extension 7 outwardly. The collar 9 can then be rotated to loosen the sleeve 16 and permit of the hose being removed from the end of the pipe member.

It will be apparent from the foregoing description that I have devised a pipe member, sleeve and collar having right and left handed screw threads, the last two mentioned elements being rotated in opposite directions to bind the end of a hose upon the pipe member. The collar and sleeve of my coupling are constructed of brass, bronze or similar metal, while the pipe member 1 can be made of iron similar to fire plugs, hydrants and engine connections.

Having fully described my invention, what I claim and desire to secure by Letters Patent is:

In a hose coupling, the combination with a hose having a flared end, of a pipe member having a tapering end adapted to fit in the flared end of said hose, a circumferentially-extending peripheral flange carried by said member and forming an annular socket, a circumferentially-extending resilient arm arranged in said socket and having an extension projecting through said flange, a collar threaded upon said pipe member and having a ratchet end adapted to enter said socket
5 and engage said arms, and a tapering sleeve fitting over said hose and screwed upon said collar.

In testimony whereof I affix my signature in the presence of two witnesses.

ALEXIS ALEXANDER VINORSKY.

Witnesses:
  MAX H. SROLOVITZ,
  A. J. TRIGG.